United States Patent [19]
Widgery

[11] Patent Number: 5,263,663
[45] Date of Patent: Nov. 23, 1993

[54] STOWAGE BAND ADAPTED FOR RELEASABLY MAINTAINING PARACHUTE SUSPENSION LINES IN A LOOPED CONDITION AND METHOD OF USING THE SAME

[76] Inventor: William T. Widgery, 6469 S. Magnolia St., Englewood, Colo. 80111

[21] Appl. No.: 25,914

[22] Filed: Mar. 3, 1993

Related U.S. Application Data

[63] Continuation of Ser. No. 927,251, Aug. 7, 1992, abandoned, which is a continuation of Ser. No. 814,311, Dec. 23, 1991, abandoned, which is a continuation of Ser. No. 655,216, Mar. 7, 1991, abandoned, which is a continuation of Ser. No. 335,752, Apr. 10, 1989, abandoned.

[51] Int. Cl.⁵ .............................................. B64D 17/40
[52] U.S. Cl. .................................................... 244/148
[58] Field of Search ................................ 244/142–148, 244/149; 114/347

[56] References Cited

U.S. PATENT DOCUMENTS

| | | |
|---|---|---|
| 1,575,631 | 9/1925 | Larimore et al. . |
| 1,682,912 | 8/1926 | Keyser . |
| 1,704,927 | 1/1927 | Taylor . |
| 1,728,859 | 9/1929 | Frame . |
| 1,815,267 | 7/1931 | Mackall . |
| 2,366,764 | 1/1945 | Wilson . |
| 2,760,741 | 4/1955 | Tauty . |
| 2,978,212 | 4/1961 | Istel et al. . |
| 3,940,095 | 2/1976 | Asciutto . |
| 4,034,940 | 7/1977 | Bird . |
| 4,583,480 | 4/1986 | Hamilton et al. ................. 714/374 |

*Primary Examiner*—Galen Barefoot
*Attorney, Agent, or Firm*—Dunlap, Codding & Lee

[57] ABSTRACT

A stowage band adapted for releasably maintaining parachute suspension lines in a looped condition and also relates to a method of using such stowage band. The stowage band includes an elastic, hollow, seamless, endless ring, or alternatively, an elastic, hollow tube having a first longitudinal end and a second longitudinal end. One of the longitudinal ends is inserted within the interior of the other longitudinal end, and the longitudinal ends are permanently secured together by an adhesive. The stowage band is capable of stretching to a relatively great degree and is capable of rolling and twisting to a relatively great degree. Also, the stowage band tends not to break during normal usage, but is sufficiently weak so that breakage will occur if the suspension lines are severely snagged. The stowage band is wrapped about a stowage holder such that only portions of the stowage band other than the region of the interconnected longitudinal ends surrounds the looped suspension lines.

33 Claims, 5 Drawing Sheets

STOWAGE BAND ADAPTED FOR RELEASABLY MAINTAINING PARACHUTE SUSPENSION LINES IN A LOOPED CONDITION AND METHOD OF USING THE SAME

This is a continuation of copending application(s) Ser. No. 07/927,251, filed on Aug. 7, 1992, now abandoned, which was a continuation of application Ser. No. 07/814,311, filed on Dec. 23, 1991, now abandoned, which was a continuation of application Ser. No. 07/655,216, filed on Mar. 7, 1991, now abandoned, which was a continuation of application Ser. No. 07/335,752, filed on Apr. 10, 1989, now abandoned.

BACKGROUND OF THE INVENTION

Parachutes generally include a harness adapted to surround the upper torso of a parachutist or adapted to surround cargo, a canopy (usually umbrella or wing shaped) for creating air resistance, and suspension lines connecting the canopy to the harness. A parachute also includes a bag or container into which the canopy can be folded and from which the canopy may be selectively discharged by a pull cord. When the canopy is folded within the bag or container, the suspension lines are folded in a zig-zag manner. In order to releasably secure the looped ends of the suspension lines to the container, two opposing series of looped stowage holders are provided on the container, and a rubberband or bungie cord is looped through a corresponding one of the stowage holders and then around the looped ends of the suspension lines.

When the canopy is selectively discharged from the container, then the suspension lines will be withdrawn from their zig-zag, folded condition by the tension exerted on the suspension lines due to the air resistance experienced by the canopy. When the suspension lines are unfolded, then the rubberbands or bungie cords must stretch and permit the looped ends of the suspension lines to be released. During this unfolding process, the bag or container tends to flip-flop due to the suspension lines tugging alternately at the rubberbands or bungie cords attached to a stowage holder in one series, and then the other series.

The foregoing description of parachute construction and operation is readily known and understood by parachutists and is revealed in such publications as U.S. Pat. Nos. 2,366,764; 2,978,212; 3,940,095; and 4,034,940.

The use of rubberbands to releasably maintain the parachute suspension lines in a zig-zag, folded condition suffers from a few drawbacks. First, since the rubberbands have squared or cornered edges, the rubberbands will tend to snap or flip away or off from the looped suspension line ends when the suspension lines are subjected to the tugging force of the canopy. Also, because of the tremendous forces associated with such tugging, the rubberbands tend to break relatively often, thereby requiring frequent replacement. Both of these features—the snapping or flipping of the rubberband away or off from the looped ends of the suspension lines and the breakage of the rubberbands—tends to cause the bag or container to flip-flop radically as the suspension lines are unfolded. Such flip-flopping can result in the suspension lines becoming tangled or twisted, which can cause parachute malfunction, and also can result in an erratic flight, which can cause nearby parachutists or their parachutes to bump into each other.

The use of bungie cords instead of rubberbands also suffers from several drawbacks. Bungie cords are fashioned of solid elastic or rubber, and therefore tend not to stretch very much. Although the bungie cords do not have any square or cornered edges, they still do not roll or twist very well. Also, the bungie cords tend not to break, even though it is desireable that the bungie cords break when the suspension lines are severely snagged during the unfolding process.

SUMMARY OF THE INVENTION

The present invention relates to a stowage band adapted for releasably maintaining parachute suspension lines in a looped condition and also relates to a method of using such stowage band. The stowage band includes an elastic, hollow, seamless, endless ring, or alternatively, an elastic, hollow tube having a first longitudinal end and a second longitudinal end. One of the longitudinal ends is inserted within the interior of the other longitudinal end, and the longitudinal ends are permanently secured together by an adhesive. The stowage band is capable of stretching to a relatively great degree and is capable of rolling and twisting to a relatively great degree. Also, the stowage band tends not to break during normal usage, but is sufficiently weak so that breakage will occur if the suspension lines are severely snagged. The stowage band is wrapped about a stowage holder such that only portions of the stowage band other than the region of the interconnected longitudinal ends surrounds the looped suspension lines.

BRIEF DESCRIPTION OF THE DRAWINGS

The invention will be described with reference to the accompanying drawings, wherein.

DESCRIPTION OF A PREFERRED EMBODIMENT

Figure 1:
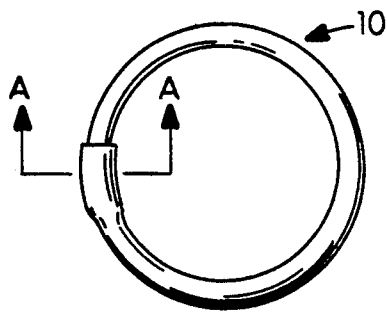
FIG. 1 is a top view of a stowage band in accordance with one embodiment of the present invention.
Figure 2:
FIG. 2 is a cross-sectional view of the stowage band shown in FIG. 1 taken along the line A—A.

The invention will be described with reference to the accompanying drawings wherein like reference numerals refer to the same item. There is shown in FIG. 1 a stowage band 10 in accordance with one embodiment of the present invention. The stowage band 10 is formed of an elastic, hollow tube having a first longitudinal end and a second longitudinal end. The tube may be fashioned of a latex rubber. In the embodiment shown in FIGS. 1 and 2, one longitudinal line of the tube is inserted within the interior of the other longitudinal end, with the longitudinal ends being secured together by an adhesive disposed between the longitudinal ends. A slight drawback of the embodiment shown in FIGS. 1 and 2 is that the overlapping longitudinal ends form a discontinuous surface in the region of overlap.

Figure 3:
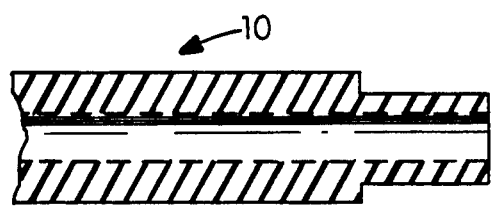
FIG. 3 is a partial plan view of the longitudinal ends of a tube in a stowage band in accordance with another embodiment of the present invention.
Figure 3:
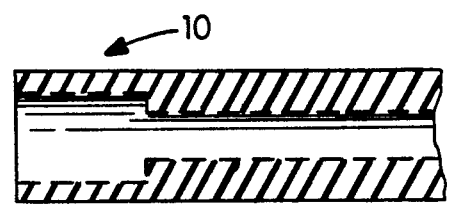
Figure 4:
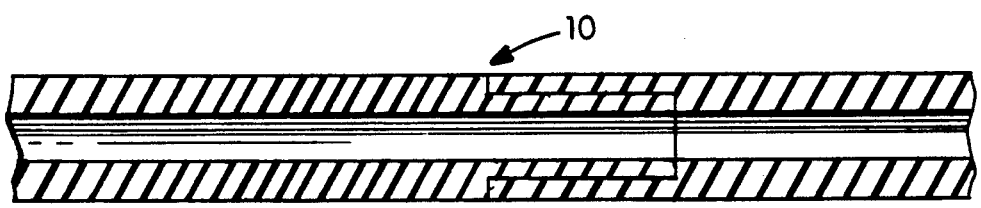
FIG. 4 is a cross-sectional view of the interconnected longitudinal ends of the tube of the stowage band shown in FIG. 3.

There is shown in FIGS. 3 and 4 a stowage band 10 in accordance with another embodiment of the present invention. One longitudinal end possesses an external diameter slightly smaller than the external diameter of the remaining portion of the tube, and the other longitudinal end has an internal diameter equal to the diameter of the first longitudinal end and slightly larger than the internal diameter of the remaining portion of the tube. These two longitudinal ends form male and female cooperating sections, which again, may be permanently secured together by means of an adhesive. As best shown in FIG. 4, when these two longitudinal ends are interconnected, the surface of the stowage band 10 is continuous and smooth even in the region of overlap.

Figure 5:
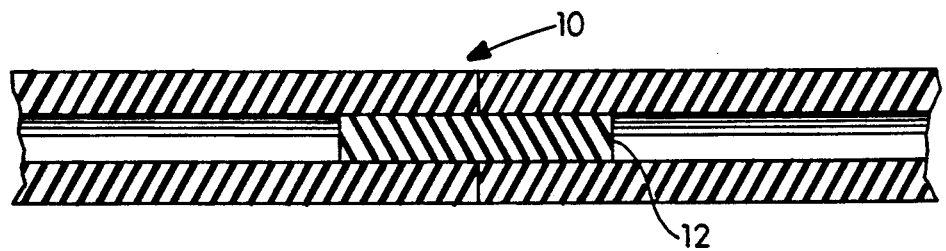
FIG. 5 is a cross-sectional view of the interconnected longitudinal ends of yet another stowage ring in accordance with the present invention.

Yet another embodiment of the stowage band 10 in accordance with the present invention is shown in FIG. 5. In this embodiment, each longitudinal end surrounds an associated end of a cylindrical plug 12, which is preferably fashioned of an elastic material. The longitudinal ends of the tube are permanently secured to the cylindrical plug 12 by an adhesive. It will be appreciated that the outer surface of the stowage band 10 in the embodiment shown in FIG. 5 is continuous and smooth even in the region of the cylindrical plug 12.

Figure 6:
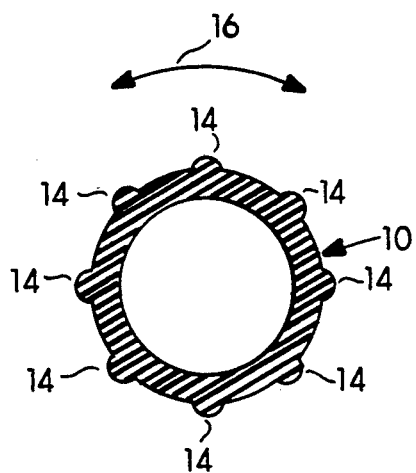
FIG. 6 is an end view of a tube forming a stowage ring in accordance with yet another embodiment of the present invention.

FIG. 6 depicts an end view of a tube utilized in still another embodiment of the stowage ring 10 in accordance with the present invention. The tube possesses a series of equiangularly spaced ridges or ribs 14 extending longitudinally along the outer peripheral surface of the tube. The longitudinal ribs 14 tend to promote the rolling and twisting of the tube in either of the two rotational directions shown by the arrows 16. Although eight such longitudinal ribs 14 are shown in FIG. 6, it should be appreciated that other numbers of ribs 14 can be advantageously used. Alternatively the exterior surface of the tube may be fashioned with dimples or bumps for the same purpose.

Figure 12:
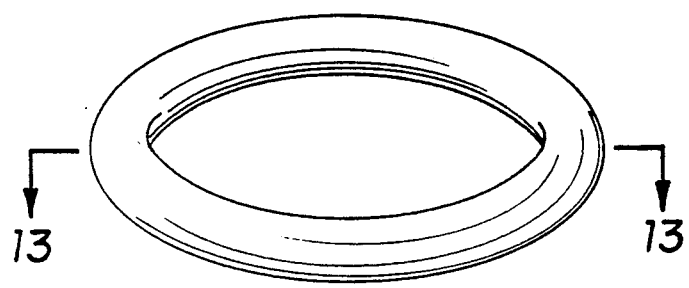
FIG. 12 is a perspective view of another embodiment of the present invention showing a stowage band formed of an endless, seamless ring of tubing.
Figure 13:
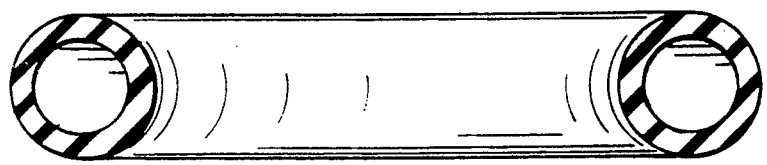
FIG. 13 is a cross sectional view along line 13—13 of FIG. 12.

Alternatively, the stowage band 10 may be formed by a molding or injection process as a seamless, endless ring of hollowed elastic material, as shown in FIGS. 12 and 13.

The tube forming the stowage band 10 preferably possesses a length within the range of two inches to seven inches, preferably possesses an interior diameter substantially within the range of one-sixteenth inch to one-quarter of an inch, and preferably possesses an exterior diameter substantially within the range of one-eighth of an inch to one-half of an inch. The hollow interior of the stowage band 10 permits the band to stretch a relatively great amount and permits the stowage band 10 to rotate and twist to a relatively great degree.

Through experimentation it has been found that the stowage band 10 as shown in FIGS. 1 and 2 breaks less frequently than conventional rubberbands, but breaks more frequently than bungie cords. Consequently, it is believed that the stowage band 10 of the present invention requires less replacement than rubberbands and is safer than both rubberbands and bungie cords.

Figure 7:
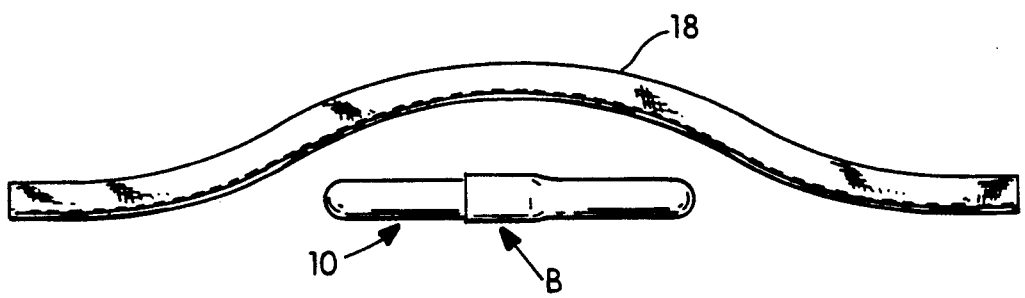
FIG. 7 is a schematic side view of a stowage band in accordance with the present invention disposed beneath a looped stowage holder.
Figure 8:
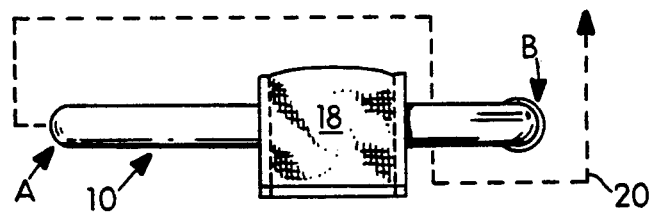
FIG. 8 is a schematic end view of the stowage band and stowage holder shown in FIG. 7 illustrating how the stowage band is maneuvered to surround the stowage holder.
Figure 9:
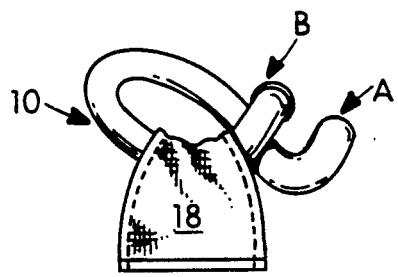
FIG. 9 is a schematic end view of the stowage band and stowage holder shown in FIG. 8 after the stowage band has been manipulated in accordance with the illustration in FIG. 8.

Since the interconnected longitudinal ends of the tube forming the stowage band 10 form a relatively weak section of the stowage band 10, there is a preferred method of attaching the stowage band 10 to a stowage band holder. As shown in FIGS. 7 and 8, the stowage band 10 is disposed beneath the looped stowage band holder 18 connected to the bag or container (not shown). The stowage band 10 is slightly stretched into an elongated condition such that the interconnected longitudinal ends of the tube are disposed at one elongated end B, and such that the side of the stowage ring 10 opposite to the interconnected longitudinal ends forms the other elongated end A. The elongated end A is then wrapped around the stowage band holder 18 and then between the stowage band holder 18 and the elongated end B—as shown by the arrow 20. Thereafter, the elongated end A is stretched and pulled such that the stowage band 10 is secured to and wrapped tightly about the stowage holder 18, as shown in FIG. 9. It will be appreciated that the portion of the stowage band 10 generally defined by the elongated end A is adapted to surround the looped extremities of the suspension lines and to selectively maintain the suspension lines in a zig-zag, folded condition.

Figure 10:
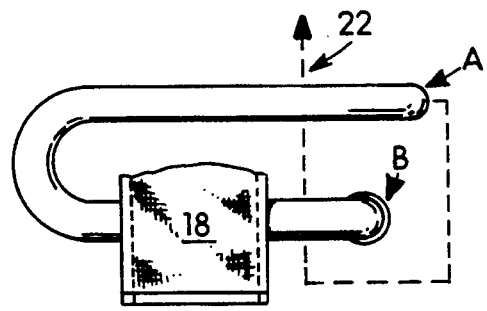
FIG. 10 is a schematic end view of a stowage band and stowage holder illustrating how the stowage band may be manipulated in another manner so that the stowage band is secured to the stowage holder.

If one desires the stowage band 10 to be more tightly secured to the stowage band holder 18, then the elongated end A may be wrapped around the elongated end B and then between the elongated end B and the stowage band holder 18—as illustrated by the arrow 22 in FIG. 10.

It will be appreciated that when the stowage band 10 is secured to the stowage band holder 18 in either of the manners shown in FIGS. 7-9 or FIG. 10, then the elongated end B be subjected to a relatively insignificant stretching force relative to the portion of the stowage band 10 generally defined by the elongated end A. Thus, either of these methods of securing the stowage band 10 to the stowage band holder 18 can be utilized to help insure that the interconnected longitudinal ends of the tube will not become disconnected.

Figure 11:
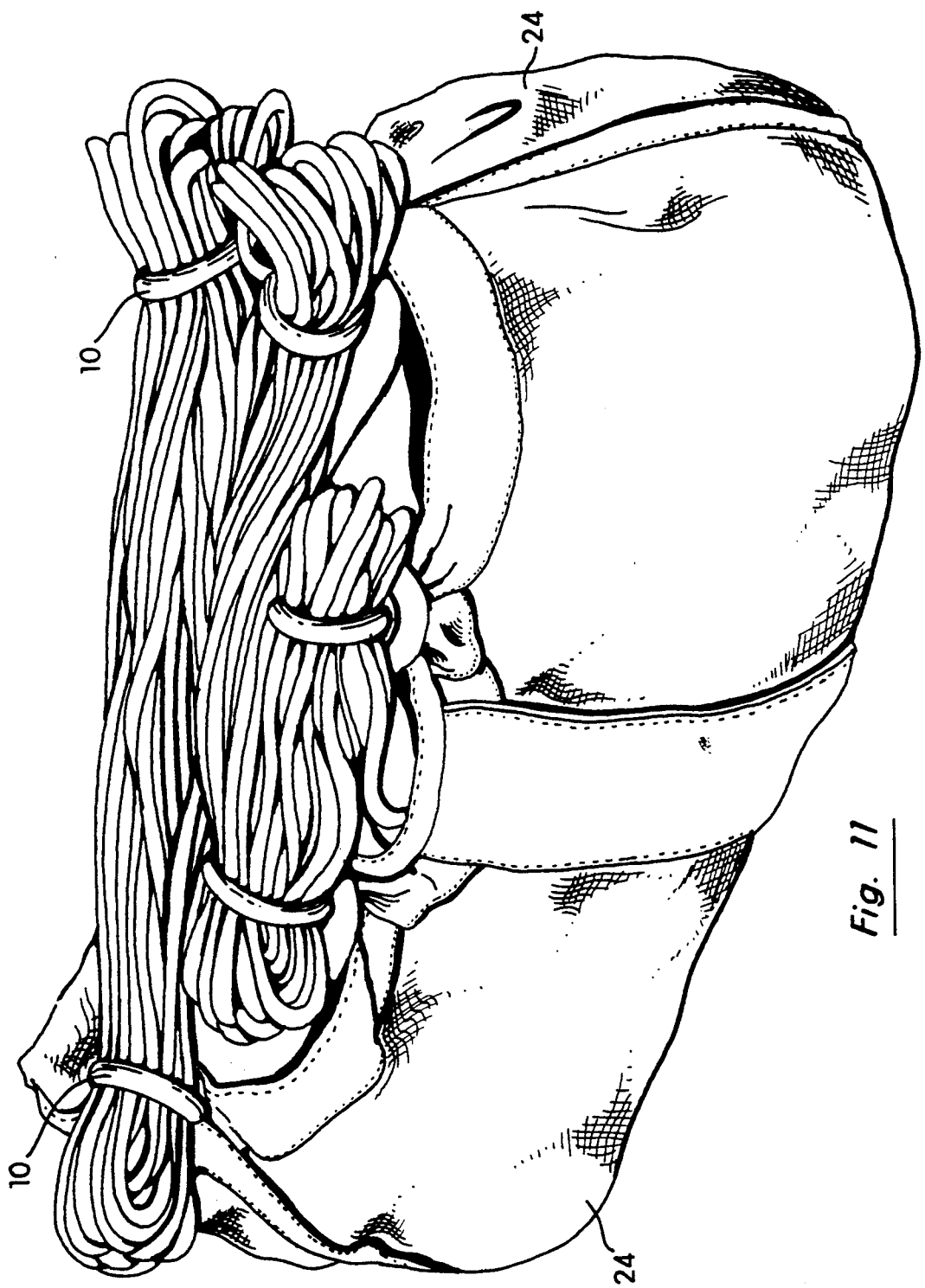
FIG. 11 is a perspective view of a bag or container in which the canopy is folded and the suspension lines are folded in a zig-zag manner, with stowage bands in accordance with the invention secured to the stowage band holders and releasably maintaining the looped ends of the suspension lines.

FIG. 11 depicts several stowage bands 10 used to selectively maintain parachute suspension lines in a zig-zag, folded condition. There is shown in FIG. 11 a bag or container 24 containing a folded parachute canopy (not shown). The peripheral edge of the opening of the container 24 possesses two series of stowage holders 18. A stowage band 10 is secured to each stowage holder and surrounds the looped extremities of the suspension lines.

The stowage band of the present invention may be adapted for use with so-called bungie bags. These bungie bags either possess a long bungie cord extending through a channel in the peripheral lip of the bag, which cord can be pulled and stretched upwardly through slits in the lip for surrounding the looped ends of the suspension lines or possess a series of bungie cord segments arranged at spaced locations around the lip of the bag for the same purpose. In either embodiment, the ends of the bungie cord are fixedly secured to the bag or are knotted. The hollow elastic tube of the present invention could be utilized instead of the bungie cord.

The applicant is also submitting to the Patent Office concurrently with this application several photographs depicting the construction and operation of the stowage band 10 of the present invention, which photographs are to be included in the file wrapper.

Although particular embodiments of the present invention have been described and illustrated herein, it should be recognized that modifications and variations may readily occur to those skilled in the art and that such modifications and variations may be made without departing from the spirit and scope of my invention. Consequently, my invention as claimed below may be practiced otherwise than as specifically described above.

I claim:

1. A stowage band adapted for releasably maintaining parachute suspension lines in a looped condition, said stowage band comprising a ring formed of resilient hollow tubing wherein the wall of the tubing is sufficiently thin to permit the tubing to collapse readily when twisted, whereby as the looped suspension lines are pulled apart the band will twist upon itself in a spiral fashion gradually releasing the suspension lines.

2. A stowage band according to claim 1 wherein the exterior surface of said ring is provided with a plurality of longitudinally extending ridges or ribs.

3. A stowage band according to claim 1 wherein the ring is formed from a tube having a first longitudinal end and a second longitudinal end further comprises means for fixedly securing the two longitudinal tube ends together, whereby the tube is formed into the ring.

4. The stowage band of claim 3 wherein the first longitudinal end is inserted within the interior of said tubing at the second longitudinal end and wherein said securing means includes adhesive.

5. A stowage band according to claim 4 wherein the first longitudinal end possesses an exterior diameter substantially equal to the interior diameter of the second longitudinal end.

6. A stowage band according to claim 3 wherein said securing means includes a plug adapted to be inserted into the interior of said tube at both the first longitudinal end and the second longitudinal end.

7. A stowage band according to claim 1 wherein said tubing possesses an interior diameter substantially within the range of one-sixteenth of an inch to one-quarter of an inch and possesses an exterior diameter substantially within the range of one-eighth of an inch to one-half of an inch.

8. A stowage band according to claim 1 wherein the outer peripheral surface of said ring is substantially circular in cross section and wherein the inner peripheral surface of said ring is substantially circular in cross section.

9. The stowage band of claim 1 wherein the ring is seamless.

10. The stowage band of claim 1 wherein the ring is characterized in cross-section as circular.

11. The stowage band of claim 1 wherein the circumference of the ring is within the range of two inches to seven inches.

12. A parachute including a harness, a canopy, suspension lines connecting said harness to said canopy, and a bag or container into which said canopy may be folded, said container including:
a stowage band adapted for releasably maintaining the parachute suspension lines in a looped condition, said stowage band comprising a ring formed of resilient hollow tubing wherein the wall of the tubing is sufficiently thin to permit the tubing to collapse readily when twisted, whereby as the looped suspension lines are pulled apart the band will twist upon itself in a spiral fashion gradually releasing the suspension lines.

13. The parachute of claim 12 wherein the exterior surface of said ring is provided with a plurality of longitudinally extending ridges or ribs.

14. The parachute of claim 12 wherein the tubing has a first longitudinal end and a second longitudinal end and wherein the stowage band further comprises means for fixedly securing the two longitudinal ends of the tubing together, whereby the tubing is formed into the ring.

15. The parachute of claim 14 wherein the first longitudinal end of the tubing is inserted within the interior of said tubing at the second longitudinal end and wherein said securing means includes adhesive.

16. The parachute of claim 15 wherein the first longitudinal end of the tubing forming the stowage band possesses an exterior diameter substantially equal to the interior diameter of the second longitudinal end of the tubing.

17. The parachute of claim 14 wherein the securing means includes a plug adapted to be inserted into the interior of the tubing at both the first longitudinal end and the second longitudinal end.

18. The parachute of claim 12 wherein the tubing forming the ring of the stowage band in cross-section has an internal diameter substantially within the range of one-sixteenth of an inch to one-quarter of an inch and has an exterior diameter substantially within the range of one-eighth of an inch to one-half of an inch.

19. The parachute of claim 12 wherein the ring has a circumference of about two inches to about seven inches.

20. The parachute of claim 12 wherein the tubing is characterized in cross-section as circular.

21. The parachute of claim 12 wherein the ring is seamless.

22. The parachute of claim 12 wherein the outer peripheral surface of the ring is substantially circular in cross-section and wherein the inner peripheral surface of the ring is substantially circular in cross-section.

23. A method for releasably maintaining parachute suspension lines in a looped condition comprising:
releasably securing the suspension lines with a stowage band comprising a ring formed of resilient hollow tubing wherein the wall of the tubing is sufficiently thin to permit the tubing to collapse readily when twisted, whereby as the looped suspension lines are pulled apart the band will twist upon itself in a spiral fashion gradually releasing the suspension lines.

24. The method of claim 23 wherein the stowage band is defined further as having a circumference of about two inches to about seven inches.

25. The method of claim 23 wherein the stowage band is a seamless ring.

26. The method of claim 23 wherein the tubing has a first longitudinal end and a second longitudinal end and wherein the stowage band further comprises means for fixedly securing the two longitudinal ends of the tubing together, whereby the tubing is formed into the ring.

27. The method of claim 26 wherein the first longitudinal end is inserted within the interior of said tubing at the second longitudinal end and wherein said securing means includes adhesive.

28. The method of claim 27 wherein the first longitudinal end possesses in cross-section an exterior diameter substantially equal to the interior diameter of the second longitudinal end.

29. The method of claim 26 wherein the securing means includes a plug adapted to inserted into the interior of the tubing at both the first longitudinal end and the second longitudinal end.

30. The method of claim 23 wherein in cross-section the ring has an internal diameter substantially within the range of one-sixteenth of an inch to one-quarter of an inch and has an exterior diameter substantially within the range of one-eighth of an inch to one-half of an inch.

31. The method of claim 23 wherein the exterior surface of said ring is provided with a plurality of longitudinally extending ridges or ribs.

32. The method of claim 23 wherein the outer peripheral surface of said ring is substantially circular in cross-section and wherein the inner peripheral surface of said ring is substantially circular in cross-section.

33. The method of claim 23 wherein the ring is characterized in cross-section as circular.

* * * * *

UNITED STATES PATENT AND TRADEMARK OFFICE
CERTIFICATE OF CORRECTION

PATENT NO. : 5,263,663
DATED : November 23, 1993
INVENTOR(S) : William T. Widgery It is certified that error appears in the above-identified patent and that said Letters Patent is hereby corrected as shown below:

Column 1, lines 59 and 60, the word "feature-s" should be -- features --.

Column 3, line 62, a comma should be inserted after the word "Alternatively."

Column 5, line 41, after the word "end" please insert -- and --.

Signed and Sealed this

Twenty-seventh Day of September, 1994

Attest:

BRUCE LEHMAN

Attesting Officer

Commissioner of Patents and Trademarks